(12) United States Patent
Xiang et al.

(10) Patent No.: US 12,469,105 B2
(45) Date of Patent: Nov. 11, 2025

(54) IMAGE UPSAMPLING

(71) Applicants: Hewlett-Packard Development Company, L.P., Spring, TX (US); Purdue Research Foundation, West Lafayette, IN (US)

(72) Inventors: Xiaoyu Xiang, Palo Alto, CA (US); Qian Lin, Palo Alto, CA (US); Jan Allebach, West Lafayette, IN (US)

(73) Assignees: Hewlett Packard Development Company, L.P., Spring, TX (US); Purdue Research Foundation, West Lafayette, IN (US)

( * ) Notice: Subject to any disclaimer, the term of this patent is extended or adjusted under 35 U.S.C. 154(b) by 386 days.

(21) Appl. No.: 17/912,536

(22) PCT Filed: Apr. 7, 2020

(86) PCT No.: PCT/US2020/027002
§ 371 (c)(1),
(2) Date: Sep. 19, 2022

(87) PCT Pub. No.: WO2021/206687
PCT Pub. Date: Oct. 14, 2021

(65) Prior Publication Data
US 2023/0139962 A1 May 4, 2023

(51) Int. Cl.
*G06T 3/4053* (2024.01)
*G06T 3/02* (2024.01)
(Continued)

(52) U.S. Cl.
CPC .............. *G06T 3/4053* (2013.01); *G06T 3/02* (2024.01); *G06T 3/4046* (2013.01); *G06T 5/70* (2024.01); *G06T 2207/20084* (2013.01)

(58) Field of Classification Search
USPC ......................................................... 382/275
See application file for complete search history.

(56) References Cited

U.S. PATENT DOCUMENTS

| 6,529,638 B1 * | 3/2003 | Westerman | ............ H04N 19/60 382/268 |
| 8,014,633 B2 | 9/2011 | Liu | |

(Continued)

FOREIGN PATENT DOCUMENTS

| CN | 106709875 A | 5/2017 |
| CN | 107463989 A | 12/2017 |

OTHER PUBLICATIONS

Wang, X., et al. "ESRGAN: Enhanced Super-Resolution Generative Adversarial Networks" In Proceedings of the European Conference on Computer Vision (ECCV), 2018, pp. 1-16.

*Primary Examiner* — Jacky X Zheng
(74) *Attorney, Agent, or Firm* — Quarles & Brady LLP

(57) ABSTRACT

An example system includes a feature extraction engine to identify features in a compressed image at a plurality of scales. The features include features corresponding to compression artifacts and features corresponding to image content to be upsampled. The feature extraction engine is to identify the features in the compressed image at a first scale based on noncontiguous pixels. The system also includes a reconstruction engine to refine the features corresponding to the image content to be upsampled and mitigate the features corresponding to the compression artifacts. The system includes an upsampling engine to generate an upsampled version of the compressed image based on the refined and mitigated features.

20 Claims, 7 Drawing Sheets

(51) Int. Cl.
    *G06T 3/4046*     (2024.01)
    *G06T 5/70*     (2024.01)

(56) References Cited

U.S. PATENT DOCUMENTS

| | | |
|---|---|---|
| 10,083,499 B1 | 9/2018 | Milanfar et al. |
| 10,467,740 B1 | 11/2019 | Putman et al. |
| 2007/0189615 A1* | 8/2007 | Liu ................. G06V 30/162 382/232 |
| 2013/0308860 A1* | 11/2013 | Mainali .............. G06V 10/757 382/199 |
| 2017/0347060 A1* | 11/2017 | Wang ................... G06T 3/4053 |
| 2018/0075581 A1 | 3/2018 | Shi et al. |
| 2018/0174275 A1* | 6/2018 | Bourdev .......... G06V 30/19147 |
| 2019/0114742 A1 | 4/2019 | Wang |
| 2020/0034948 A1* | 1/2020 | Park ..................... G06N 3/088 |
| 2024/0404017 A1* | 12/2024 | Xiang ..................... G06T 5/60 |

\* cited by examiner

IMAGE UPSAMPLING

BACKGROUND

Computer networks, such as the Internet, allow users to connect and share information. For example, email applications, messaging applications, and social media applications facilitate the sharing of information among users. In many instances, the shared information may include media, such as video, still images, and the like. To reduce the bandwidth or storage requirements for communicating media, various applications may reduce the resolution of the media or compress the media. For mobile devices with small screen sizes or limited resolution, the reduced resolution or compression may not be too noticeable to users.

In an example, the media may be compressed according to a standard adopted by the Joint Photographic Experts Group (JPEG) (e.g., the standard adopted as ITU-T Recommendation T.81 and ISO/IEC 10918-1). The JPEG standard pipeline may include a color space transformation, block splitting, a discrete cosine transformation (DCT), quantization, and entropy encoding. The JPEG standard includes a block size of 8×8.

DETAILED DESCRIPTION

Figure 1:
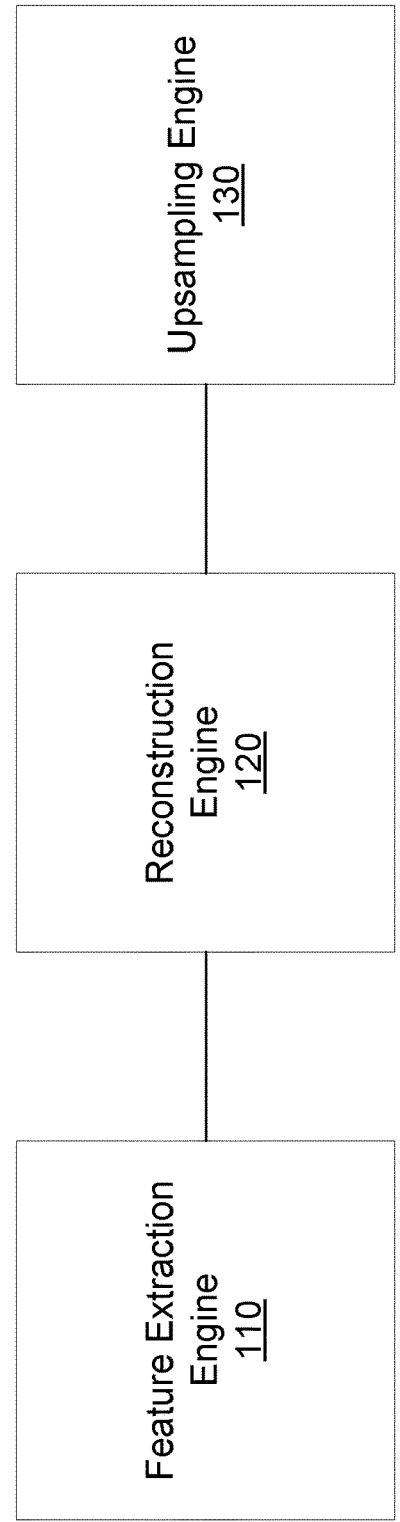
FIG. 1 is a block diagram of an example system to upsample compressed images.

A user may receive a media file and wish to print an image from the media file. However, printing a low resolution or compressed image at a large size may cause the printed image to appear pixelated or make compression artifacts more visible. The user may be dissatisfied with the quality of the resulting image. In some instances, the user may have asked a print service provider to print the image, and the print service provider may decline to print the image due to the poor quality likely to result.

The user may wish to perform an image processing operation on the received media file. For example, the user may wish to detect or identify faces in an image from the media file, the user may wish to perform optical character recognition (OCR) to identify text in the image, or the like. However, the image processing operation may perform poorly on low resolution or compressed images. The accuracy of the face detection, face identification, or OCR operation may be worse than could be achieved by performing the operation on high resolution versions of the images.

A user wishing to print an image or perform an operation on the image may increase the resolution of the image. Increasing the resolution of the image will result in new pixels that will be assigned new values. The user may apply an interpolation operation when increasing the resolution of the image, such as a bicubic interpolation operation. While a high-resolution image generated using a bicubic interpolation may be preferable over a pixelated version of the image resulting from magnification alone, users may still find the image quality unsatisfactory in many cases. Also, the bicubic interpolation may fail to reduce the visibility compression artifacts or may even amplify their visibility.

In some examples, a super-resolution (SR) neural network may be used to upsample an image. The SR neural network may produce a high-resolution image with better quality than an image generated with bicubic interpolation. However, the neural network may also fail to reduce the visibility compression artifacts or may also amplify their visibility. A compression artifact reduction (CAR) neural network to remove compression artifacts may be applied to the low-resolution image before upsampling or to the high-resolution image produced by upsampling. Using a SR neural network in combination with a CAR neural network may produce a high-resolution image with less visible compression artifacts.

However, using a CAR neural network in combination with an SR neural network may result in a number of drawbacks. Using both neural networks may result in a large number of parameters and slow running and training times (particularly if the CAR neural network operates downstream of the SR neural network). In addition, the CAR neural network may destroy high frequency information in the low-resolution image, which may result in a lower quality high-resolution image. Accordingly, the generation of high-resolution images from low-resolution, compressed images could be improved by decreasing the run and training times of an upsampling engine and increasing the quality of the high-resolution image.

As used herein, the term "image" refers to a set of values usable to produce a visual rendering. The image may include a still image, a frame from a video, a pair of interlaced fields from a video, or the like. As used herein, the term "upsample" refers to an operation that increases the resolution of an image and determines values for pixels resulting from increasing the resolution. As used herein, the term "compression artifact" refers to distortions to an image resulting from the application of lossy image compression to the image. The distortions may be visibly apparent to a viewer and reduce the perceived quality of the image.

FIG. 1 is a block diagram of an example system 100 to upsample compressed images. The system 100 may include a feature extraction engine 110, a reconstruction engine 120, and an upsampling engine 130. As used herein, the term "engine" refers to hardware (e.g., analog or digital circuitry, a processor, such as an integrated circuit, or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random-access memory (RAM), a hard-disk or solid-state drive, resistive memory, or optical media such as a digital versatile disc (DVD), and/or executed or interpreted by a processor), or hardware and software hosted at hardware.

The feature extraction engine 110 may identify features in a compressed image at a plurality of scales. For example, the feature extraction engine may analyze sets of pixels in the compressed image to detect the features, and at least some sets may include fewer than all pixels in the compressed image. As used herein, the term "scale" refers to how large a portion of the compressed image is included in a set of pixels being analyzed. In some examples, the feature extraction engine 110 may identify the features in the compressed image at a first scale based on noncontiguous pixels. Accordingly, the scale may not refer to the number of pixels included in the set but the distance between the pixels in the set separated by the furthest distance. The identified features may include features corresponding to compression artifacts and features corresponding to image content to be upsampled.

The reconstruction engine 120 may refine the features corresponding to the image content to be upsampled and mitigate the features corresponding to the compression artifacts. The reconstruction engine 120 may preprocess the features prior to upsampling to prepare the features for upsampling. For example, the reconstruction engine 120 may determine features that correspond to image content and may generate information usable to interpolate those features in the upsampled image. The reconstruction engine 120 may determine features that correspond to compression artifacts and may generate information usable to remove or reduce the presence of the compression artifacts in the upsampled image.

The upsampling engine 130 may generate an upsampled version of the compressed image based on the refined and mitigated features. For example, the information generated by the reconstruction engine 120 may be provided to the upsampling engine 130. The upsampling engine 130 may upsample the image and use the information from the reconstruction engine 120 to interpolate the image content and mitigate the compression artifacts in the upsampled image. Thus, the upsampling engine 130 outputs a high-resolution image with high perceived quality and less noticeable compression artifacts.

Figure 2:
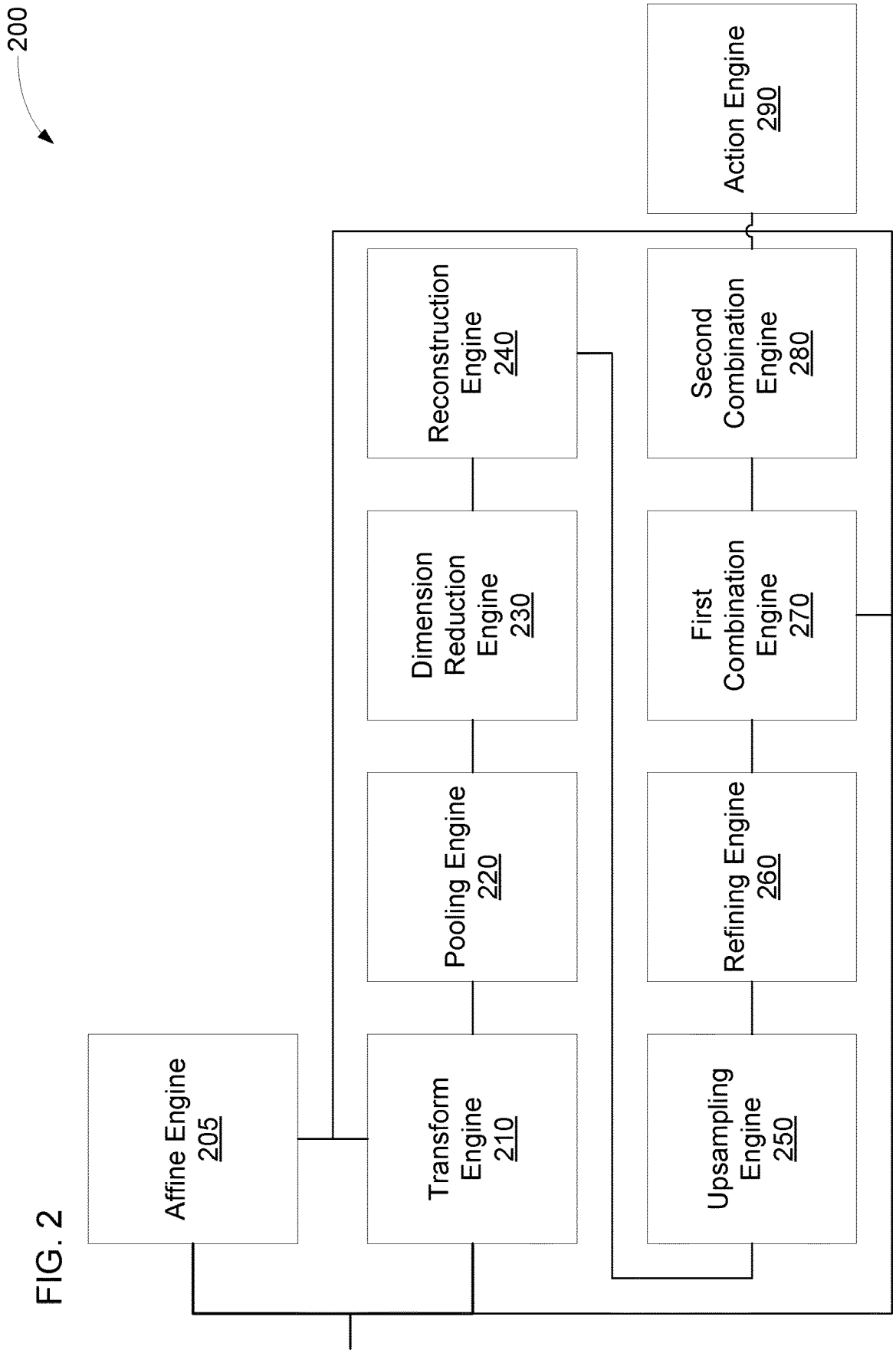
FIG. 2 is a block diagram of another example system to upsample compressed images.

FIG. 2 is a block diagram of another example system 200 to upsample compressed images. The system 200 may include a transform engine 210 and a pooling engine 220. In some examples, the feature extraction engine 110 of FIG. 1 may include the transform engine 210 and the pooling engine 220. The transform engine 210 may convert a compressed image into a feature domain. For example, the transform engine 210 may identify features in the compressed image and may produce a plurality of feature maps indicative of the identified features. The features may include features corresponding to compression artifacts and features corresponding to image content to be upsampled. The transform engine 210 may include a convolutional neural network to generate the feature maps from the compressed image. The convolutional neural network may be trained to identify the features corresponding to compression artifacts and features corresponding to image content to be upsampled.

The pooling engine 220 may identify features at a plurality of scales based on the compressed image in the feature domain. The pooling engine 220 may receive the output from the transform engine 210 and process the output to identify the features at the plurality of scales. For example, the pooling engine may apply an atrous (dilated) convolution to the feature maps generated by the transform engine 210. Each scale may include a different dilation rate for the atrous convolution. In an example, a first scale may include a dilation rate greater than one, so the pixels analyzed by the atrous convolution may be noncontiguous. A second scale may include a dilation rate equal to one, so the pixels analyzed by the atrous convolution may be contiguous. As used herein, a "plurality of atrous convolutions" includes at least one atrous convolution with a rate greater than one. It may include an atrous convolution with a rate equal to one.

The plurality of scales may include an intrablock scale smaller than a size of a compression block used to compress the compressed image and an interblock scale larger than the size of the compression block used to compress the compressed image. For example, the pooling engine 220 may be designed for a particular compression scheme, and the scales for the pooling engine may be selected based on the particular compression scheme. A first dilation rate may be selected so that the resulting atrous convolution is smaller than a block size for the compression scheme. A second dilation rate may be selected so that the resulting atrous convolution is larger than the block size for the compression scheme. Thus, the pooling engine 220 may acquire intrablock and interblock information usable to detect local details and larger context information that will allow compression artifacts to be distinguished from image content.

In some examples, the pooling engine 220 may identify the features at the plurality of scales without indication of an alignment of compression blocks used to compress the compressed image. The alignment of the compression blocks may not always be known, so the pooling engine 220 is able to process the feature maps even without aligning the atrous convolutions to the locations of the compression blocks. In other examples, the alignment may be known, and the atrous convolutions may be aligned with the compression blocks.

In an example, the pooling engine 220 may apply the atrous convolution at each scale in parallel to the atrous convolutions at other scales. The pooling engine 220 may apply each atrous convolution to the feature maps output by the transform engine 210, and the pooling engine 220 may concatenate the outputs from the plurality of atrous convolutions. In another example, the pooling engine 220 may apply the atrous convolutions sequentially. The pooling engine 220 may input the features maps from the transform engine 210 to a first atrous convolution. The pooling engine 220 may input the output from the first atrous convolution to a second atrous convolution and so on until a final output is produced from the last atrous convolution.

The system 200 may include a dimension reduction engine 230. The dimension reduction engine 230 may reduce the dimensionality of the feature maps output by the pooling engine. Reducing the dimensionality may reduce the number of computations to process the feature maps and thereby reduce the training and running time for the system 200. In some examples, the pooling engine 220 may increase the dimensionality of the feature maps. The dimension reduction engine 230 may decrease the dimensionality of the feature maps, for example, to be the same size as the input to the pooling engine 220. In an example, the dimension reduction engine 230 may include a convolutional neural network to reduce the dimensionality of the feature maps. The convolutional neural network may be 1×1 convolution to reduce the dimensionality.

The system 200 may include a reconstruction engine 240 and an upsampling engine 250. The reconstruction engine 240 may refine the features corresponding to the image content to be upsampled and mitigate the features corresponding to the compression artifacts. The reconstruction engine 240 may generate a set of feature maps that will be usable by the upsampling engine 250 to interpolate the image content and to mitigate the appearance of compression artifacts. In some examples, the upsampling engine 250 may generate residuals that will be applied to an upsampled version of the compressed image. The residuals may enhance fine features in the upsampled version of the compressed image and lessen the appearance of compression artifacts. The reconstruction engine 240 may process the feature maps from the dimension reduction engine 230 to produce a set of feature maps with residuals to refine the features corresponding to the image content to be upsampled and to mitigate the features corresponding to the compression artifacts. The reconstruction engine 240 may include a neural network with weights selected to generate the residuals that refine the features corresponding to the image content to be upsampled and to mitigate the features corresponding to the compression artifacts. The reconstruction engine 240 may determine the residuals in a feature domain. For example, the output from the reconstruction engine 240 may be a plurality of feature maps with a resolution equal to that of the compressed image.

In an example, the reconstruction engine 240 may include a plurality of reconstruction blocks sequentially concatenated to each other. For example, the reconstruction engine 240 may include a residual dense block (RDB), a residual-in-residual dense block (RRDB), or the like. In an example, each block may include a plurality of subblocks, and each subblock may include a convolutional neural network coupled to an activation function, such as a rectified linear activation function, a leaky rectified linear activation function, or the like. There may be dense connections among the subblocks. The output from a first block may be added to the feature maps input to the reconstruction engine 240, and the sum may be input to the next block. Each later block may input the sum from the previous block and add the block's output to the sum from the previous block. The reconstruction engine 240 may include a skip connection and may add the output from the final block to the feature maps input to the reconstruction engine 240.

The upsampling engine 250 may upsample the residuals. For example, the upsampling engine 250 may convert the residuals from low-resolution feature maps to a high-resolution image (e.g., from a feature domain to a color domain). The upsampling engine 250 may include an Upconvolution neural network, a Pixelshuffle neural network, or the like to upsample the residuals. In some examples, the upsampling engine 250 may also refine the features corresponding to the image content to be upsampled and mitigate the features corresponding to the compression artifacts. There may not be a strict separation of the functionality of the reconstruction engine 240 and the upsampling engine 250. Rather, the reconstruction engine 240 and the upsampling engine 250 may cooperate to produce the residuals that will enhance high frequency image content and lessen the appearance of compression artifacts in the high-resolution image with some of the work being performed by each engine.

The system 200 may include a refining engine 260. The refining engine 260 may refine the upsampled residuals to improve perceptual effects. The refining engine 260 may include a convolutional neural network to operate on the high-resolution residuals in the color domain. By operating on the high-resolution residuals, the refining engine 260 may further improve high frequency components of the image beyond what may be possible for the reconstruction engine 240 operating in the low-frequency feature domain.

The system 200 may include a first combination engine 270. The first combination engine 270 may generate the upsampled version of the compressed image based on the upsampled residuals and an upsampled version of the compressed image. For example, the first combination engine 270 may receive the compressed image and upsample the compressed image. The first combination engine 270 may interpolate the compressed image during upsampling using a bilinear filter, a bicubic filter, or the like. The first combination engine 270 may combine the upsampled residuals from the refining engine 260 with the upsampled version of the compressed image, for example, by adding the upsampled residuals to the upsampled version of the compressed image. In some examples, the upsampling engine 130 of FIG. 1 may include the upsampling engine 250, the refining engine 260, and the first combination engine 270.

In some examples, multiple versions of the compressed image may be processed by the system 200 to improve the quality of the final output. For example, the system 200 may include an affine engine 205 to generate an affine transformation of the compressed image. For example, the affine engine 205 may reflect or rotate the compressed image. The affine engine 205 may provide the affine transformed image to the transform engine 210. The transform engine 210, the pooling engine 220, the dimension reduction engine 230, the reconstruction engine 240, the upsampling engine 250, and the refining engine 260 may cooperate to generate upsampled residuals for the affine transformed image in the manner previously discussed. The affine engine 205 may provide the affine transformed image to the first combination engine 270, and the first combination engine 270 may combine the upsampled residuals for the affine transformed image with an upsampled version of the affine transformed image in the manner previously discussed.

The system 200 may include a second combination engine 280. The second combination engine 280 may receive the upsampled version of the compressed image and the upsampled version of the affine transformation of the compressed image from the first combination engine 270. The second combination engine 280 may combine the upsampled version of the compressed image and the upsampled version of the affine transformation of the compressed image to produce a final upsampled image. The second combination engine 280 may undo the affine transformation. For example, the second combination engine 280 may apply an inverse of the affine transformation to the upsampled version of the affine transformed image. The result will be a second version of the upsampled image with slight variations in pixel values from the first version of the upsampled image that did not undergo the affine transformation and inversion. Other than the slight variations, the two versions may be otherwise aligned. In some examples, more than one affine transformation may be applied to the compressed image, and there may be more than two versions of the upsampled image. The second combination engine 280 may combine the various versions of the upsampled image, for example, by arithmetic mean, geometric mean, median, etc. for the pixel values of the various versions.

The system 200 may include an action engine 290. The action engine 290 may perform various tasks based on the upsampled image or may determine whether upsampling should be performed at all. For example, the action engine 290 may initially receive the compressed image and determine the compressed image should be enhanced. For example, the action engine 290 may detect whether compression is present or determine the resolution of the image. Based on the resolution or presence of compression, the action engine 290 may determine whether the image is suitable for a later task, and the action engine 290 may cause the image to be upsampled if it is not. In some examples, the action engine 290 may also determine if an affine transformation should be used to improve results or how many affine transformations should be used to improve results.

The action engine 290 may determine how much to upsample the compressed image. In some examples, the resolution of the output from the refining engine 260 may be an integer multiple of the resolution of the compressed image. For example, the height of the output may be an integer multiple of the height of the compressed image, and the width of the output may be the same integer multiple of the width of the compressed image. In some examples, there may be a distinct set of neural networks for the engines 210-260 for each integer multiple (e.g., a distinct set of weights for the neural networks). The action engine 290 may determine that the compressed image should be upsampled by an integer amount and select the set of neural networks corresponding to that integer. The action engine 290 may determine that the compressed image should be upsampled by a fractional amount (e.g., 2.3×) or an integer amount with no corresponding neural network. In such a case, the action engine 290 may select the integer scaling for which a neural network is available that is nearest to the determined amount to upsample (e.g., a neural network for 2× scaling may be used for a 2.3× determined amount). The result may be further scaled using a bicubic, bilinear, etc. upsampling to achieve the determined amount (e.g., 1.15× bicubic or bilinear upsampling may be applied after the 2× upsampling to achieve the 2.3× upsampling). The additional upsampling may be performed by the first combination engine 270, the second combination engine 280, or the action engine 290.

Once the upsampled image is received, the action engine 290 may perform a task with the upsampled image. For example, the action engine 290 may cause a printer to print the upsampled image. The action engine 290 may determine whether to upsample the image before printing or how much to upsample image based on a comparison of the resolution or amount of compression to the size to be printed. The action engine 290 may include predetermined rules for the resolution per size to achieve a print of acceptable quality (e.g., for various amounts of compression). If the action engine 290 determines upsampling should occur, the action engine 290 may determine how much to upsample the image based on predetermined rules for the resolution per size, the size to be printed, and the resolution of the compressed image. Once the upsampled image of the desired size has been generated, the action engine 290 may transmit the upsampled image to the printer and instruct it to print the image at the selected print size. The perceived quality of the upsampled image once printed may be sufficient to justify printing and of much better quality than the results from other upsampling techniques.

In some examples, the action engine 290 may perform optical character recognition on the upsampled version of the compressed image or detect a face in the upsampled version of the of the compressed image. For example, the action engine 290 may extract a portion of the image containing text before or after upsampling the image and apply an optical character recognition engine to the portion of the image, or the action engine 290 may apply an optical character recognition engine to the entire image. The results from the optical character recognition may be more accurate than if the optical character recognition had been applied to the compressed image. Similarly, the action engine 290 may apply a face detection or face identification engine to the upsampled image. The results from the face detection or face identification may be more accurate than if the face detection or face identification had been applied to the compressed image.

Figure 3:
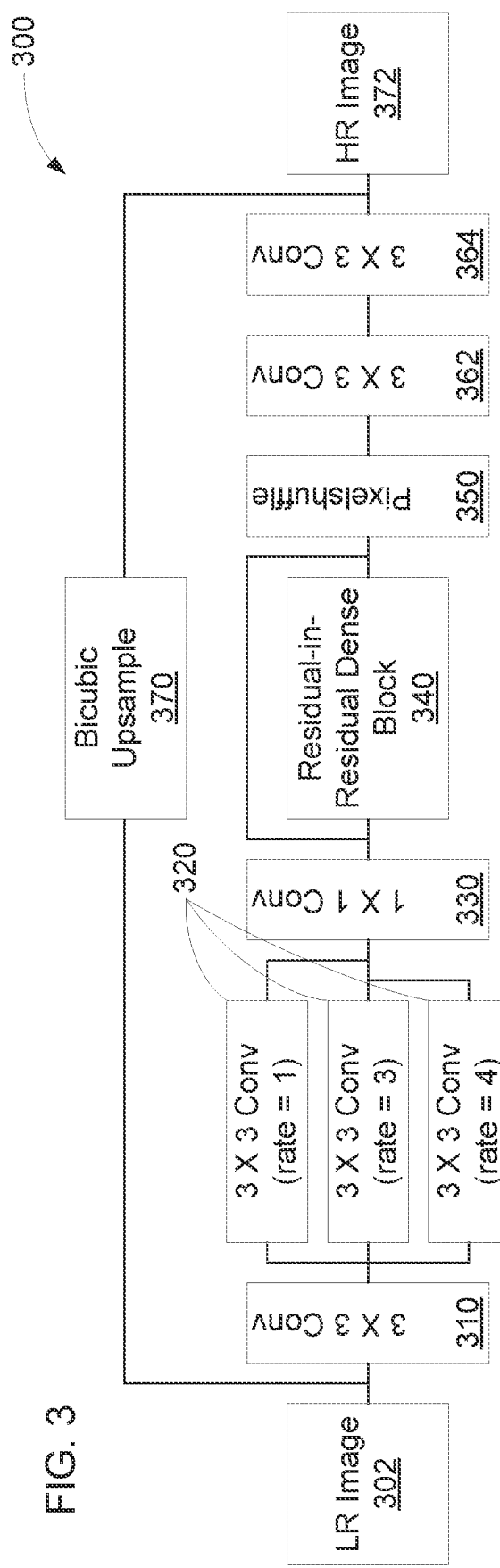
FIG. 3 is a block diagram of still another example system to upsample compressed images.

FIG. 3 is a block diagram of still another example system 300 to upsample compressed images. The system 300 may receive a low-resolution (LR) image 302 with a dimensionality of 3×h×w, where h and w are the height and width in pixels of the low-resolution image. The system 300 may implement the transform engine 210 as a 3×3 convolutional neural network 310. The 3×3 convolutional neural network 310 may convert the low-resolution image 302 to a plurality of feature maps with dimensionality of 64×h×w.

The system 300 may implement the pooling engine 220 as three atrous convolutional neural networks 320 of rates one, three, and four. For a rate of one, each pixel included as an input to the atrous convolution may be immediately adjacent to the next row and immediately adjacent to the next column of pixels included as inputs. For a rate of three, each pixel included as an input may be separated from the next adjacent row of pixels and the next adjacent column of pixels by two pixels not included as inputs. For a rate of four, each pixel included as an input may be separated from the next adjacent row of pixels and the next adjacent column of pixels by three pixels not included as inputs. The atrous convolution of rate one may be three pixels wide and three pixels tall. The atrous convolution of rate three may be seven pixels wide and seven pixels tall. The atrous convolution of rate four may be nine pixels wide and nine pixels tall. Accordingly, for a compression scheme with an eight by eight block size, the atrous convolutions of rate one and three may be intrablock convolutions, and the atrous convolution of rate four may be interblock convolution. As illustrated, the atrous convolutional neural networks may be applied in parallel.

The concatenated output from the atrous convolutional neural networks may have a dimensionality of 192×h×w. The system 300 may implement the dimension reduction engine 230 as a 1×1 convolutional neural network 330. The 1×1 convolutional neural network 330 may reduce the dimensionality to 64×h×W.

The system 300 may implement the reconstruction engine 240 as a residual-in-residual dense block 340. In some examples, the residual-in-residual dense block 340 may include 15, 20, 23, 25, 30, etc. blocks sequentially concatenated to each other. As previously discussed, the residual-in-residual dense block 340 may include a skip connection connecting the input to the output. The dimensionality of the output from the residual-in-residual dense block 340 may be 64×h×w.

The system 300 may implement the upsampling engine 250 as a Pixelshuffle neural network 350. The Pixelshuffle neural network may convert the plurality of feature maps from the residual-in-residual dense block to a residual image of dimensionality 3×H×W, where H and W are the height and width in pixels of the high-resolution image. H and W may be multiples (e.g., integer multiples) of h and w.

The system 300 may implement the refining engine 260 as a first 3×3 convolutional neural network 362 and a second 3×3 convolutional neural network 364. The dimensionality of the output from the first 3×3 convolutional neural network 362 and the second 3×3 convolutional neural network 364 may remain 3×H×W.

The system 300 may implement the upsampling portion of the first combination engine 270 as a bicubic upsample 370 that may upsample the low-resolution image 302 and apply bicubic interpolation during the upsampling. The bicubic upsample 370 may increase the resolution from 3×h×w to 3×H×W. The output from the bicubic upsample 370 may be combined with the output from the second 3×3 convolutional neural network 364 to produce the high-resolution (HR) image 372. Although specific examples of the dimensionality of inputs and outputs is discussed, the dimensionality may vary in other examples.

Figure 4:
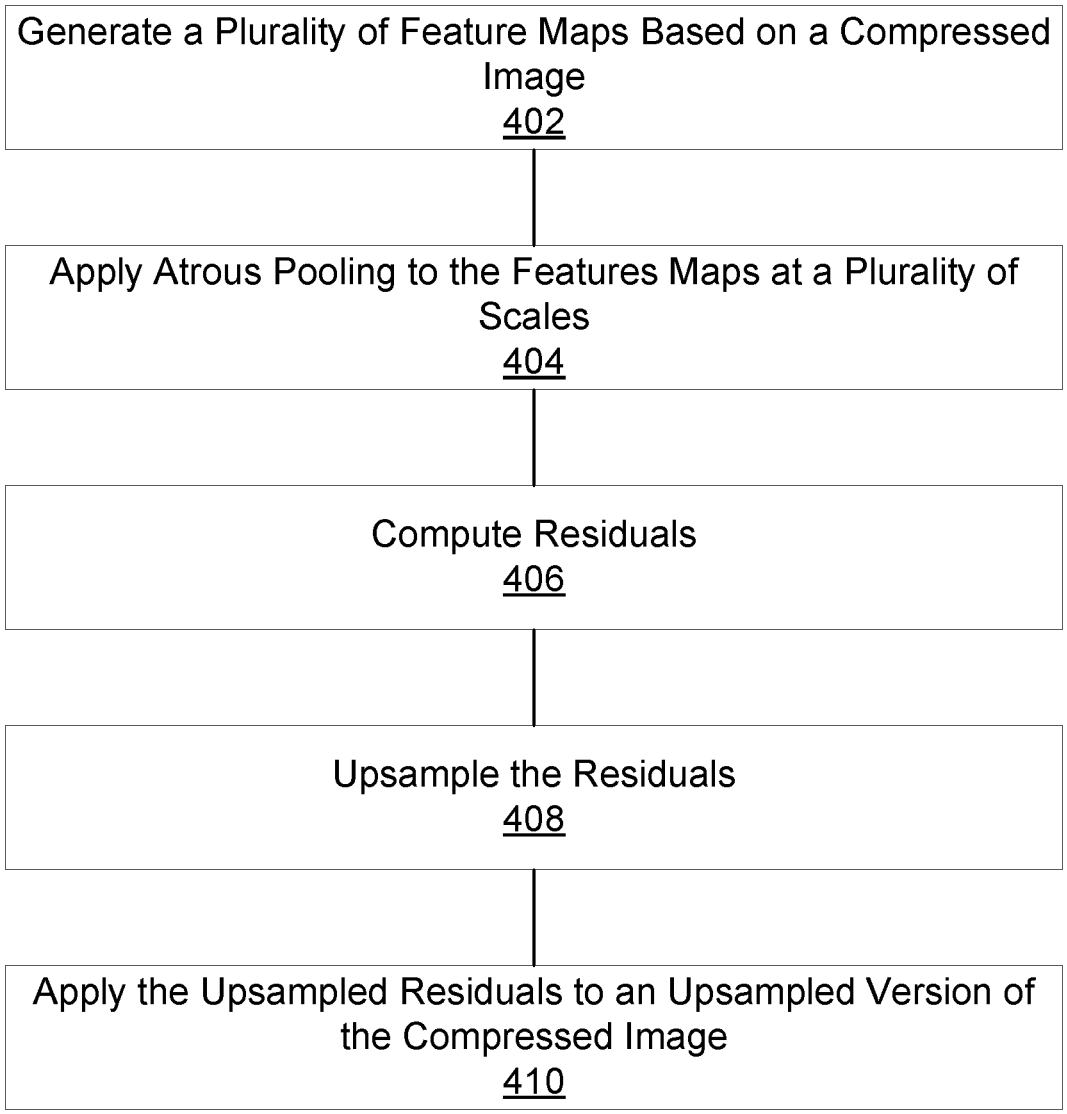
FIG. 4 is a flow diagram of an example method to upsample a compressed image.

FIG. 4 is a flow diagram of an example method 400 to upsample a compressed image. A processor may perform elements of the method 400. At block 402, the method 400 may include generating a plurality of feature maps based on a compressed image. For example, generating the plurality of feature maps may include converting the compressed image to a feature domain.

At block 404, the method 400 may include applying atrous pooling to the feature maps at a plurality of scales to identify features corresponding to compression artifacts and features corresponding to image content to be upsampled. As previously discussed, atrous convolutions of various scales may be used to identify the features.

Block 406 may include computing residuals usable to refine the features corresponding to the image content to be upsampled and mitigate the features corresponding to the compression artifacts. Computing the residuals may include determining high frequency image content to be enhanced or preserved in the upsampled image and determining compression artifacts to be removed or reduced in the upsampled image.

Block 408 may include upsampling the residuals. For example, the residuals may be converted from a low-resolution feature domain to a high-resolution color domain with a same resolution as the upsampled image. Upsampling the residuals may include computing interstitial values from the residuals in the low-frequency feature domain.

At block 410, the method 400 may include applying the upsampled residuals to an upsampled version of the compressed image. For example, the upsampled version of the compressed image may include values interpolated with a simple filter. The residuals may include high-frequency information lost during filtering and may include values to cancel compression artifacts. The residuals may be added to the upsampled version of the compressed image to add the high-frequency information and reduce or remove the compression artifacts. Referring to FIG. 1, in an example, the feature extraction engine 110 may perform blocks 402 and 404, the reconstruction engine 120 may perform block 406, and the upsampling engine 130 may perform blocks 408 and 410.

Figure 5:
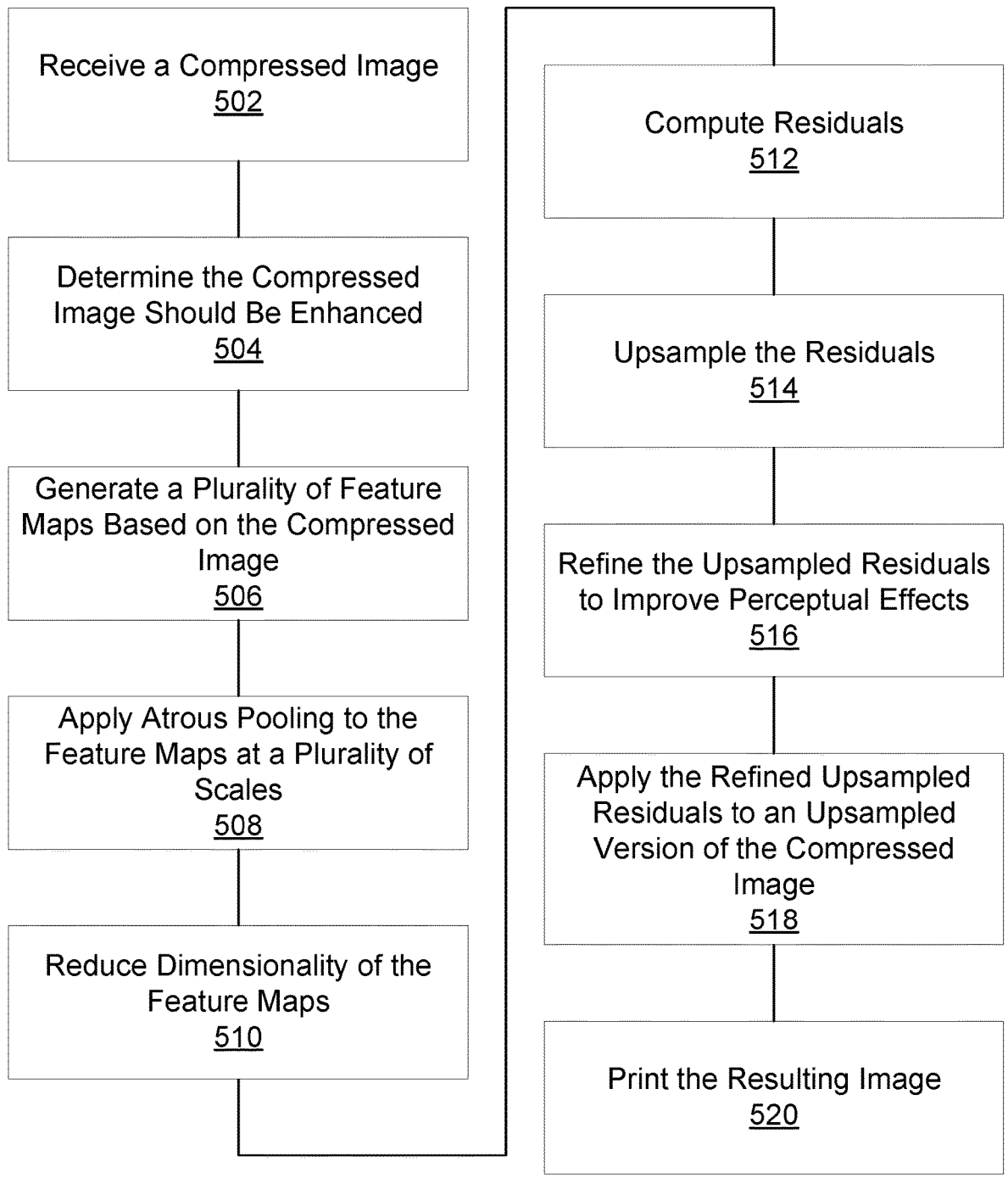
FIG. 5 is a flow diagram of another example method to upsample a compressed image.

FIG. 5 is a flow diagram of another example method 500 to upsample a compressed image. A processor may perform elements of the method 500. At block 502, the method 500 may include receiving a compressed image. For example, a user may wish to print a compressed image and may provide the compressed image for printing.

Block 504 may include determining the compressed image should be enhanced. For example, the user may have indicated a size at which the user wishes to print the compressed image. The image resolution or amount of compression may be compared to the desired print size to determine whether the quality of print is likely to be sufficient. In some examples, based on a determination the print will be of insufficient quality at the current resolution or compression, block 504 may include determining an amount to upsample the image to be able to produce a print of sufficient quality. Predetermined rules based on perceived quality by users may be used to determine whether to enhance the image and by how much.

At block 506, the method 500 may include generating a plurality of feature maps based on a compressed image. For example, a convolutional neural network may be used to convert the compressed image to a plurality of feature maps in a feature domain. Block 508 may include applying atrous pooling to the feature maps at a plurality of scales to identify features corresponding to compression artifacts and features corresponding to image content to be upsampled. For example, each of a plurality of convolutional neural networks may apply an atrous convolution at one of the plurality of scales to the feature maps.

At block 510, the method 500 may include reducing the dimensionality of the feature maps with the atrous pooling applied. In some examples, applying the atrous pooling may increase the dimensionality of the feature maps. Accordingly, the dimensionality may be reduced, which may result in fewer computations. In some examples, the dimensionality may be reduced to be the same as the dimensionality of the feature maps before the atrous pooling was applied.

Block 512 may include computing residuals usable to refine the features corresponding to the image content to be upsampled and mitigate the features corresponding to the compression artifacts. For example, a plurality of sequentially concatenated blocks may be used to determine the residuals. The plurality of blocks may include a residual dense block, a residual-in-residual dense block, or the like. Computing the residuals may include computing residuals that will enhance high frequency information in the upsampled image and remove or reduce the presence of compression artifacts in the upsampled image. Computing the residuals may include computing residuals in a feature domain that will be usable to determine the upsampled image.

At block 514, the method 500 may include upsampling the residuals. Upsampling the residuals may include converting the residuals from a set of low-resolution feature maps to a high-resolution residual image. Upsampling the residuals may include using a neural network to upsample the residuals, such as Upconvolution, Pixelshuffle, or the like.

Block 516 may include refining the upsampled residuals to improve perceptual effects. A convolutional neural network may be applied to the high-resolution residual image to refine the upsampled residuals. Refining the upsampled residuals may include further improving the appearance of high frequency components in the image. At block 518, the method 500 may include applying the refined, upsampled residuals to an upsampled version of the compressed image. For example, the residuals may be added to the upsampled version of the compressed image. The upsampled version of the compressed image may have been generated with an interpolation filter. The residuals may add high-frequency information lost by the interpolation filter and may remove compression artifacts.

Block 520 may include printing the upsampled image resulting from applying the refined, upsampled residuals to the upsampled version of the compressed image. For example, the resulting image may be transmitted to a printer, and the printer may be instructed to print the resulting image. The print size used to determine how much to upsample the image may be the print size at which the printer is instructed to print the image. In an example, the action engine 290 of FIG. 2 may perform blocks 502, 504, and 520, the transform engine 210 may perform block 506, the pooling engine 520 may perform block 508, the dimension reduction engine 230 may perform block 510, the reconstruction engine 240 may perform block 512, the upsampling engine 250 may perform block 514, the refining engine 260 may perform block 516, and the first combination engine 270 may perform block 518.

Figure 6:
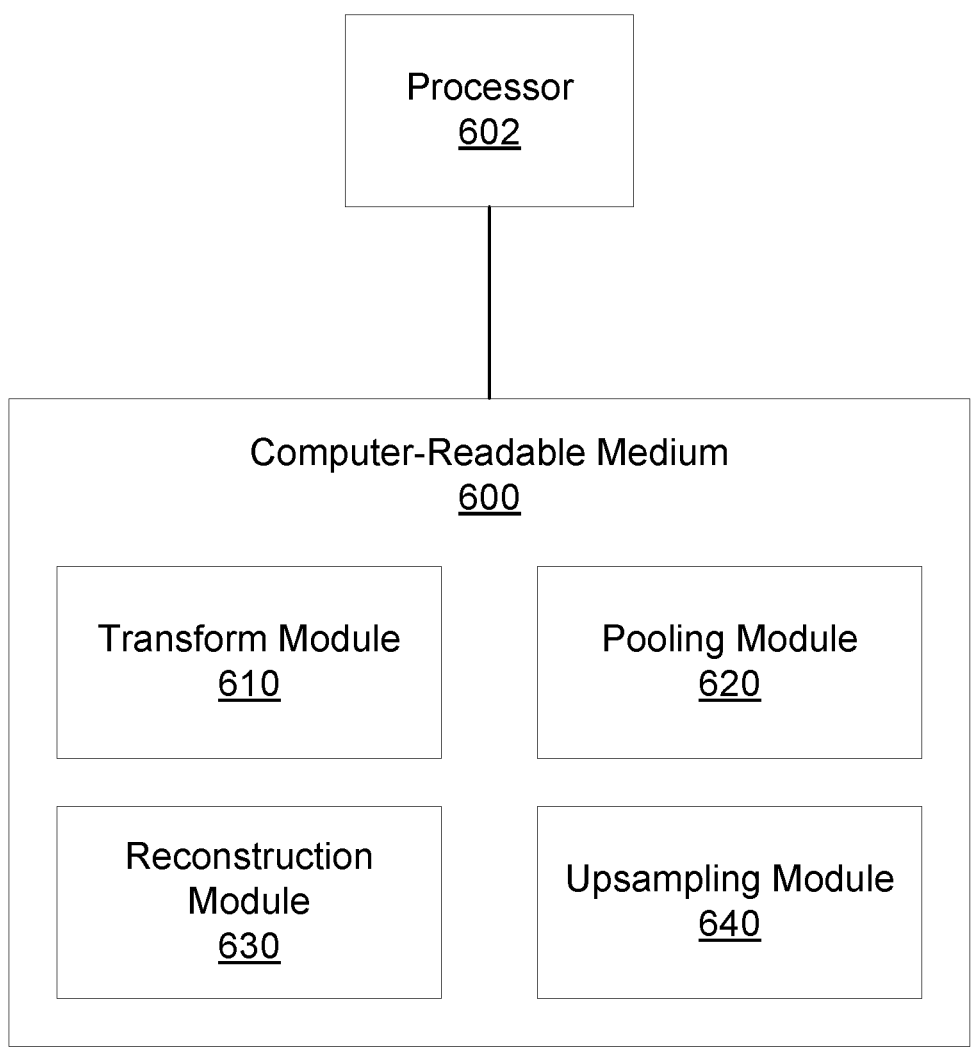
FIG. 6 is a block diagram of an example computer-readable medium including instructions that cause a processor to upsample a compressed image.

FIG. 6 is a block diagram of an example computer-readable medium 600 including instructions that, when executed by a processor 602, cause the processor 602 to upsample a compressed image. The computer-readable medium 600 may be a non-transitory computer-readable medium, such as a volatile computer-readable medium (e.g., volatile RAM, a processor cache, a processor register, etc.), a non-volatile computer-readable medium (e.g., a magnetic storage device, an optical storage device, a paper storage device, flash memory, read-only memory, non-volatile RAM, etc.), and/or the like. The processor 602 may be a general-purpose processor or special purpose logic, such as a microprocessor (e.g., a central processing unit, a graphics processing unit, etc.), a digital signal processor, a microcontroller, an ASIC, an FPGA, a programmable array logic (PAL), a programmable logic array (PLA), a programmable logic device (PLD), etc.

The computer-readable medium 600 may include a transform module 610, a pooling module 620, a reconstruction module 630, and an upsampling module 640. As used herein, a "module" (in some examples referred to as a "software module") is a set of instructions that when executed or interpreted by a processor or stored at a processor-readable medium realizes a component or performs a method. The transform module 610 may include instructions that, when executed, cause the processor 602 to convert a compressed image into a feature domain. For example, the transform module 610 may cause the processor 602 to convert the compressed image into the feature domain in any of the manners previously discussed.

The pooling module 620 may cause the processor 602 to apply atrous pooling to the compressed image in the feature domain at a plurality of scales to identify features corresponding to compression artifacts and features corresponding to image content to be upsampled. For example, the pooling module 620 may cause the processor 602 to apply the atrous pooling to the compressed image in feature domain at the plurality of scales in any of the manners previously discussed.

The reconstruction module 630 may cause the processor 602 to refine the features corresponding to the image content to be upsampled and mitigate the features corresponding to the compression artifacts. For example, the reconstruction module 630 may cause the processor 602 to refine and mitigate the features in any of the manners previously discussed.

The upsampling module 640 may cause the processor 602 to generate an upsampled version of the compressed image based on the refined and mitigated features. For example, the upsampling module 640 may cause the processor 602 to generate the upsampled version of the compressed image in any of the manners previously discussed. In an example, when executed by the processor 602, the transform module 610 and the pooling module 620 may realize the feature extraction engine 110 of FIG. 1, the reconstruction module 630 may realize the reconstruction engine 120, and the upsampling module 640 may realize the upsampling engine 130.

Figure 7:
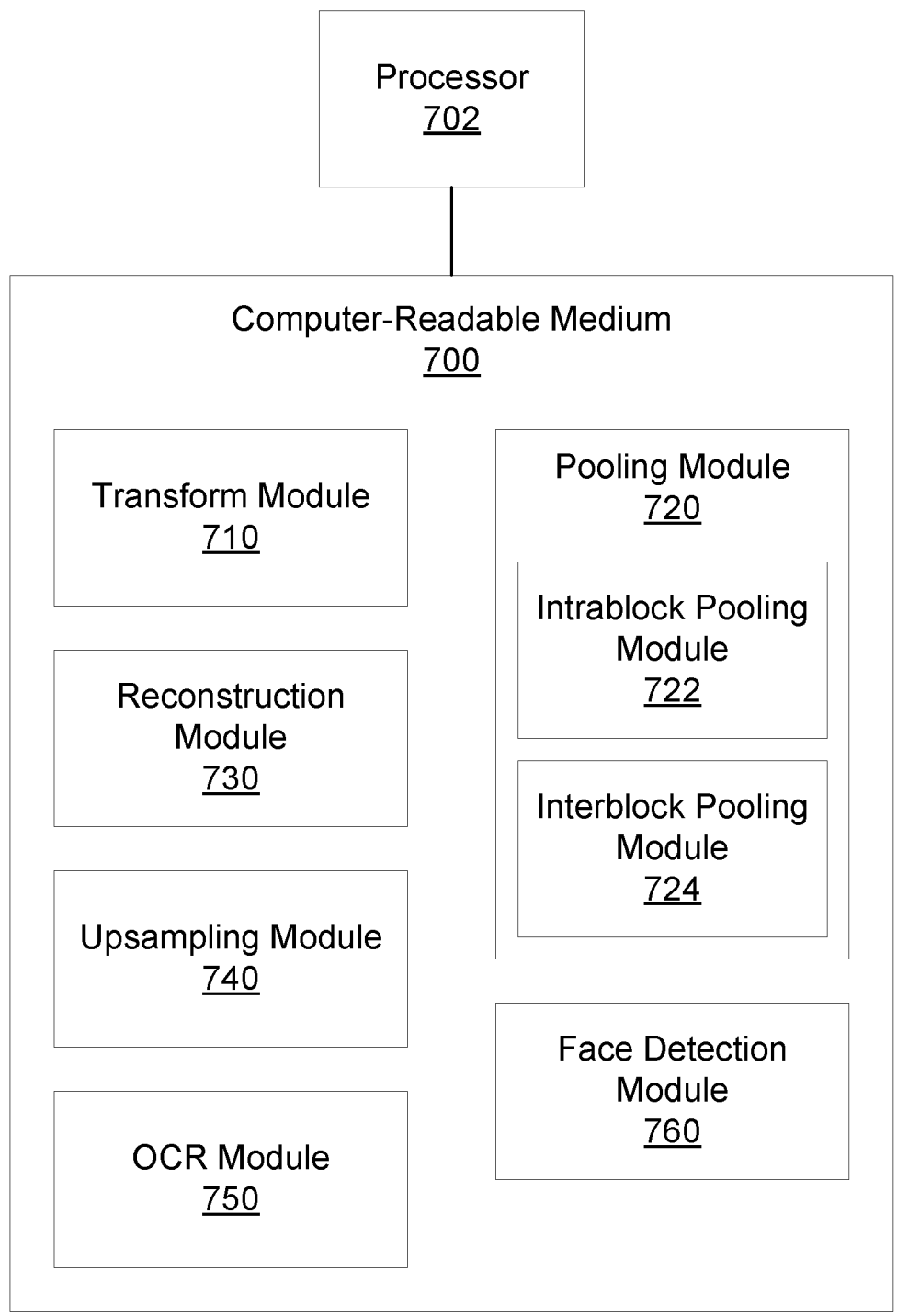
FIG. 7 is a block diagram of another example computer-readable medium including instructions that cause a processor to upsample compressed images.

FIG. 7 is a block diagram of another example computer-readable medium 700 including instructions that, when executed by a processor 702, cause the processor 702 to upsample a compressed image. The computer-readable medium 700 may include a transform module 710, a pooling module 720, a reconstruction module 730, an upsampling module 740, an optical character recognition (OCR) module 750, and a face detection module 760. The pooling module 720 may include an intrablock pooling module 722 and an interblock pooling module 724.

The transform module 710 may include instructions that cause the processor 702 to convert a compressed image into a feature domain. For example, the transform module 710 may cause the processor 702 to process the compressed image using a convolutional neural network to convert the compressed image into the feature domain in any of the manners previously discussed.

The pooling module 720 may cause the processor 702 to apply atrous pooling to the feature maps at a plurality of scales to identify features corresponding to compression artifacts and features corresponding to image content to be upsampled. For example, the pooling module 720 may cause the processor 702 to apply the atrous pooling at each scale in parallel to the atrous pooling at other scales or sequentially to the atrous pooling at the other scales in any of the manners previously discussed.

The pooling module 720 may cause the processor 702 to apply the atrous pooling to the compressed image in the feature domain at the plurality of scales without an indication of an alignment of compression blocks used to compress the compressed image. For example, alignment with the compression blocks may not be needed to upsample the compressed image and remove the compression artifacts. Accordingly, the pooling module 720 may cause the processor 702 to apply the atrous pooling without attempting to align with the compression blocks.

The plurality of scales may include an intrablock scale smaller than a size of a compression block used to compress the compressed image and an interblock scale larger than the size of the compression block used to compress the compressed image. For example, the intrablock pooling module 722 may cause the processor 702 to apply the atrous pooling to the compressed image at intrablock scales in any of the manners previously discussed, and the interblock pooling module 724 may cause the processor 702 to apply the atrous pooling to the compressed image at interblock scales in any of the manners previously discussed.

The reconstruction module 730 may cause the processor 702 to refine the features corresponding to the image content to be upsampled and mitigate the features corresponding to the compression artifacts. For example, the reconstruction module 730 may cause the processor 702 to generate a set of residuals in the feature domain to refine the features corresponding to the image content to be upsampled and to mitigate the features corresponding to the compression artifacts in any of the manners previously discussed.

The upsampling module 740 may cause the processor 702 to generate an upsampled version of the compressed image based on the refined and mitigated features. For example, the upsampling module 740 may cause the processor 702 to process the residuals in the feature domain using a neural network to generate an upsampled version of the residuals in any of the manners previously discussed. The upsampling module 740 may cause the processor 702 combine the upsampled residuals with a version of the compressed image upsampled with a filter in any of the manners previously discussed.

The optical character recognition module 750 may cause the processor 702 to perform optical character recognition on the upsampled version of the compressed image output by the upsampling module 740. For example, the optical character recognition module 750 may cause the processor 702 to use a neural network to identify and output characters in the upsampled image. The face detection module 760 may cause the processor 702 to detect a face in the upsampled version of the of the compressed image output by the upsampling module 740. For example, the face detection module 760 may cause the processor 702 to use a neural network to detect and indicate the locations of faces in the upsampled image. Referring to FIG. 2, in an example, when executed by the processor 702, the transform module 710 may realize the transform engine 210, the pooling module 720, the intrablock pooling module 722, and the interblock pooling module 724 may realize the pooling engine 220, the reconstruction module 730 may realize the reconstruction engine 240, the upsampling module 740 may realize the upsampling engine 250, and the optical character recognition module 750 and the face detection module 760 may realize the action engine 290.

The above description is illustrative of various principles and implementations of the present disclosure. Numerous variations and modifications to the examples described herein are envisioned. Accordingly, the scope of the present application should be determined only by the following claims.

What is claimed is:

1. A system comprising:
   a feature extraction engine to identify features in a compressed image at a plurality of scales, the features including features corresponding to compression artifacts and features corresponding to image content to be upsampled by applying atrous pooling to the compressed image in the feature domain at each of the plurality of scales in parallel to the atrous pooling at other scales, wherein the feature extraction engine is to identify the features in the compressed image at a first scale based on noncontiguous pixels;
   a reconstruction engine to refine the features corresponding to the image content to be upsampled and mitigate the features corresponding to the compression artifacts; and
   an upsampling engine to generate an upsampled version of the compressed image based on the refined and mitigated features.

2. The system of claim 1, wherein the feature extraction engine includes a transform engine to convert the compressed image into the feature domain, and a pooling engine to apply the atrous pooling to identify the features at the plurality of scales based on the compressed image in the feature domain.

3. The system of claim 1, wherein the reconstruction engine is to determine residuals to refine the features corresponding to the image content to be upsampled and mitigate the features corresponding to the compression artifacts, wherein the upsampling engine is to upsample the residuals, and wherein the upsampling engine includes a combination engine to generate the upsampled version of the compressed image based on the upsampled residuals and an upsampled version of the compressed image.

4. The system of claim 3, wherein the upsampling engine includes a neutral network to upsample the residuals.

5. The system of claim 1, further comprising an affine engine to generate an affine transformation of the compressed image, wherein the feature extraction engine, the reconstruction engine, and the upsampling engine are to generate an upsampled version of the affine transformation of the compressed image, and further comprising a combination engine to combine the upsampled version of the compressed image and the upsampled version of the affine transformation of the compressed image to produce a final upsampled image.

6. The system of claim 1, wherein the reconstruction engine comprises a plurality of reconstruction blocks sequentially concatenated to each other.

7. The system of claim 6, wherein the plurality of reconstruction blocks respectively include a plurality of subblocks, and wherein the plurality of subblocks respectively include a convolutional neural network.

8. A method, comprising:
   generating a plurality of feature maps based on a compressed image;
   applying atrous pooling to the feature maps at a plurality of scales to identify features corresponding to compression artifacts and features corresponding to image content to be upsampled, including applying the atrous pooling to the feature maps at each scale in parallel to the atrous pooling at other scales;
   computing residuals usable to refine the features corresponding to the image content to be upsampled and mitigate the features corresponding to the compression artifacts;
   upsampling the residuals; and
   applying the upsampled residuals to an upsampled version of the compressed image.

9. The method of claim 8, further comprising refining the upsampled residuals to improve perceptual effects, wherein applying the upsampled residuals comprises applying the refined, upsampled residuals to the upsampled version of the compressed image.

10. The method of claim 8, further comprising reducing the dimensionality of the feature maps with the atrous pooling applied.

11. The method of claim 8, further comprising initially receiving the compressed image and determining the compressed image should be enhanced.

12. The method of claim 8, further comprising printing the upsampled image resulting from applying the upsampled residuals to the upsampled version of the compressed image.

13. The method of claim 8, wherein the plurality of scales includes a first scale based on noncontiguous pixels and a second scale based on contiguous pixels.

14. The method of claim 8, wherein identifying the features occurs without indication of an alignment of compression blocks used to compress the compressed image.

15. A non-transitory computer-readable medium comprising instructions that, when executed by a processor, cause the processor to:
   convert a compressed image into a feature domain;
   apply atrous pooling to the compressed image in the feature domain at a plurality of scales to identify features corresponding to compression artifacts and features corresponding to image content to be upsampled, including applying the atrous pooling at each scale in parallel to the atrous pooling at other scales;
   refine the features corresponding to the image content to be upsampled and mitigate the features corresponding to the compression artifacts; and
   generate an upsampled version of the compressed image based on the refined and mitigated features.

16. The computer-readable medium of claim 15, wherein the plurality of scales include an intrablock scale smaller than a size of a compression block used to compress the compressed image and an interblock scale larger than the size of the compression block used to compress the compressed image.

17. The computer-readable medium of claim 15, wherein the instructions cause the processor to apply the atrous pooling to the compressed image in the feature domain at the plurality of scales without an indication of an alignment of compression blocks used to compress the compressed image.

18. The computer-readable medium of claim 15, further comprising instructions to:
   perform optical character recognition on the upsampled version of the compressed image; or
   detect a face in the upsampled version of the of the compressed image.

19. The computer-readable medium of claim 15, wherein each scale corresponds to a different dilation rate for the atrous pooling.

20. The computer-readable medium of claim 19, wherein a dilation rate of a first scale of the plurality of scales is greater than one, and a dilation rate of a second scale of the plurality of scales is equal to one.

* * * * *